United States Patent [19]

Meyers et al.

[11] Patent Number: 4,900,573

[45] Date of Patent: Feb. 13, 1990

[54] METHOD OF INHIBITING OIL ADSORPTION IN COATED FRIED FOODS USING HYDROXYPROPYL METHYL CELLULOSE

[75] Inventors: Marc A. Meyers; Jerry R. Conklin, both of Midland, Mich.

[73] Assignee: The Dow Chemical Company, Midland, Mich.

[21] Appl. No.: 208,956

[22] Filed: Jun. 17, 1988

[51] Int. Cl.$^4$ ............................................... A23B 4/10
[52] U.S. Cl. ................................ 426/302; 426/438; 426/573
[58] Field of Search .................. 426/643, 92, 89, 273, 426/302, 573, 578, 438, 94

[56] References Cited

U.S. PATENT DOCUMENTS

| | | | |
|---|---|---|---|
| 3,471,304 | 10/1969 | Hamdy | 426/92 |
| 3,794,742 | 2/1974 | Harris | 426/302 |
| 3,956,515 | 5/1976 | Moore | 426/305 |
| 4,058,631 | 11/1977 | Roan | 426/438 |
| 4,375,484 | 3/1983 | Lee | 426/302 |
| 4,513,019 | 4/1985 | Brancq | 426/302 |
| 4,661,359 | 4/1987 | Seaborne | 426/273 |
| 4,675,197 | 6/1987 | Banner et al. | 426/292 |
| 4,731,247 | 3/1988 | Wolford | 426/643 |
| 4,778,684 | 10/1988 | D'Amico et al. | 426/94 |

FOREIGN PATENT DOCUMENTS 8600501  1/1986  PCT Int'l Appl. .................. 426/92

Primary Examiner—Carolyn Paden

[57] ABSTRACT

A method of preparing a food coating composition which contains hydroxypropylmethylecellulose is disclosed. The composition comprises, hydroxypropyl methylcellulose having from about 27 to about 30 weight percent methoxyl and from about 4 to about 12 weight percent hydroxypropyl substitution, water and a batter mix, wherein the hydroxypropyl methylcellulose is essentially prehydrated to form a gum solution. The gum solution is admixed with a batter mix to form a coating composition. The viscous, coating composition is applied to food products before cooking. The cooked food product exhibits less fat absorption than a plain batter coated food product.

11 Claims, No Drawings

METHOD OF INHIBITING OIL ADSORPTION IN COATED FRIED FOODS USING HYDROXYPROPYL METHYL CELLULOSE

BACKGROUND OF THE INVENTION

Batter coated food products have broad appeal. Thus, there is great interest in thes foods being of convenience and having appealing savory characteristics. Typically, chicken, fish or other meat products are the most popular batter coated fried foods, although increasing in appeal to consumers are vegetables which are also batter coated. These food products are ideally prepared and are ready for consumer use.

Generally, the food product is coated with a flour/starch/egg mixture and is fried, or before frying the batter coated food product may be coated with a breading such as corn meal, cracker crumbs, bread crumbs and the like. A problem with such a coating mixture is that the food product absorbs a substantial amount of oil. This affects the taste and handling of the food product so the product is unappealing.

Previous attempts have been made to combat this problem of oil absorption, but they have not been successful. Some have tried altering the coating mixture by dry blending methylcellulose, having a methoxyl weight percent of 27 to 31, or dry blending hydroxypropyl methylcellulose, having a weight percent of 19 to 24 methoxyl and 4 to 12 weight percent hydroxy propoxyl, with other ingredients. Although it was previously thought that these blends reduce oil absorption by the food product, they actually do not substantially decrease the absorption.

In addition to lowering oil absorption, it is also important to have a viscous batter coating that adheres to the food product. A typical problem with batter coating compositions is that the tend to run off the food product. Therefore when the food product is fried, it lacks the desired crispiness and the food product tastes greasy or oily.

Thus, it would be desirable to develop a coating formulation which would reduce oil absorption, and be easy to use. The food product would then have the convenience and appealing savory characteristics which the consumer desires. Additionally, by reducing oil absorption the food product would also have less calories, which is always desirable to consumers.

SUMMARY OF THE INVENTION

This invention is a food coating composition and method of using such to make a coated food product. The composition comprises hydroxpropyl methylcellulose, water and a batter mix, wherein the hydroxypropyl methylcellulose is essentially in the hydrated form and has from about 27 to about 30 weight percent methoxyl and about 4 to about 12 weight percent hydroxypropyl substitution.

Generally, the hydroxypropyl methylcellulose is admixed with hot water to form a gum solution. The solution is cooled and stored for a sufficient time to allow the hydroxypropyl methylcellulose to essentially hydrate in the solution. This prehydrated gum solution can be admixed with a commercially available batter mix (although one could formulate and prepare a batter mix if so desired) to form a coating composition.

The coating composition is viscous enough to be easily applied to food products, such as chicken, fish, vegetables and the like before cooking. The cooked food product has less fat absorption than a plain batter coated food product. By reducing the amount of oil absorption the coating composition has obvious benefits to the consumer. The food product will be lower in calories, more flavorful and easy to prepare. Additionally, less oil is used when frying the coated food product, which is an economic savings.

DETAILED DESCRIPTION OF THE INVENTION

This invention is a food coating composition and method of using such. Generally, the composition comprises, essentially prehydrated hydroxypropyl methylcellulose, water and a batter mix. This coating composition can be used as an oil barrier, thereby decreasing oil absorption and increasing water retention of a food product.

By "essentially prehydrated" hydroxypropyl methylcellulose is meant that the polymer is contacted with water in such a manner that the hydroxypropyl methylcellulose is substantially or all in the hydrated form. This is accomplished, for example, by throughly admixing the hydroxypropyl methylcellulose with hot water to form a gum solution. The gum solution is cooled and left standing until the hydroxypropyl mehtylcellulose hydrates in the solution, e.g., for about 6 to about 96 hours. By hot water is meant that the water can be from about 80° to about 100° C., preferably about 90° to about 100° C.

Preferably, the hydroxypropyl methylcellulose/water mixture is stored at from about zero degrees to about 10° C. and from about 12 to about 48 hours. Most preferably, the gum solution is stored at 4° C. for about 48 hours. The prehydrated gum solution and a batter mix are directly admixed, thereby forming a wet batter coating composition.

An alternative to formulating the gum solution directly is to make an essentially prehydrated, hydroxypropyl methylcellulose gum stock solution. The stock solution contains a small amount of hot water and has a high concentration of the hydroxypropyl methylcellulose. A small amount of the gum stock solution is admixed with water to form a blend. The water can be from about 5° to about 25° C. The batter mix is added to the blend, thereby forming the wet batter coating composition of the desired concentration.

Whether formulating directly or using a gum stock solution, the wet batter composition has a viscosity from about 500 to about 1500 cps. Preferably, the wet batter coating composition has a viscosity from about 500 to about 1000 cps. This viscous wet batter composition can easily be used to coat food products without having the difficulty of the batter coating dripping off the food product before cooking.

Typically, a hydroxypropyl methylcellulose having from about 27 to about 30 weight percent methoxyl and from about 4 to about 12 weight percent hydroxypropyl substitution can be used to make the essentially prehydrated hydroxypropyl methylcellulose. Preferably, the hydroxypropyl mehtylcellulose has from about 27 to 30 weight percent methoxyl and from about 4 to about 7.5 weight percent hydroxypropyl substitution. Most preferably, the hydroxypropyl methylcellulose has from about about 28 to 30 weight percent methoxyl and from about 7.5 to about 12 weight percent hydroxypropyl substitution.

To formulate a wet batter coating composition, from about 0.25 to about 1.5 weight percent hydroxypropyl methylcellulose is directly admixed with water. This solution is essentially hydrated by techniques described previously. Preferably, from about 0.25 to about 1.0 weight percent and most preferably, about 0.5 weight percent hydroxypropyl methylcellulose is admixed with water to form the essentially hydrated gum solution.

When using a concentrated, essentially prehydrated gum stock solution, the amount of hyroxypropyl methylcellulose and water needed to make the gum stock solution can be determined by the formula described in section II of the Examples. In addition, the amount of water that is added to the hydrated gum solution before admixing with the commercial batter mix can also be determined using this formulation.

A typical food coating composition can contain from about 0.25 to about 1.5 weight percent hydroxypropyl methylcellulose, from about 60 to about 80 weight percent water and from about 20 to about 40 weight percent batter mix. Preferably, the food coating composition can contain from about 0.25 to about 1 weight percent hydroxypropyl methylcellulose, from about 65 to about 75 weight percent water, and from about 25 to about 35 weight percent batter mixture.

Generally, the wet batter coating composition is used to coat food products such as chicken-whole pieces, nuggets, etc., fish, vegetables, cheeses and the like. The food products are coated by such conventional means as dipping, spraying, brushing or similar applications. After the food product is coated with the wet batter coating composition, the food product can be breaded if so desired. Breading can include crackers, cornflakes and breadcrumbs. Optionally, spices and other flavorings may be added to the breading or could be added to the wet batter composition. Preferably, the food product is battered, breaded, battered and breaded. Typically, the batter coated food piece is fried, but can be cooked by any other conventional means.

The batter mix can be any available commercial batter, or one could prepare a mix if so desired. To prepare a mix, typical ingredients for batter mixture could be from about 30 to about 50 percent wheat flour, from about 30 to about 50 percent corn flour, up to about 5 percent salt, and up to about 3 percent sodium bicarbonate and acid phosphates. Other optional ingredients could include other flours, starches, flavorings and color, gums and emulsifiers, etc.

The coated food product after cooking, containing a hydroxypropyl methylcellulose—having from about 27 to 30 methoxyl, and from about 4 to about 7.5 hydroxypropyl substitution—in the wet batter coating composition, has from about 52 to about 59 percent less fat absorbed than a food piece which is coated with batter coating that does not have the hydroxypropyl methylcellulose in the mixture. When the coated food product contains a hydroxypropyl methylcellulose that has from about 28 to about 30 weight percent methoxyl and from about 7.5 to about 12 weight percent hydroxypropyl substitution in the wet batter coating composition, then the cooked food product absorbs from about 46 to about 50 percent less fat than the food piece which again has a coating without the hydroxypropyl methylcellulose. Because there are obvious caloric and taste benefits to the consumer, reducing fat absorption of the food product is desirous.

EXAMPLES

When preparing a batter coating mixture in these examples containing a cellulose ether, the mixture was either dry blended or a hot/cold technique was used. In addition, the cellulose ether batter mixture can be made directly or can be made by using either a percent stock gum solution or a percent dry stock, depending upon whether one is dry blending or is using the hot/cold techinque.

I. Process for Including Cellulose Ether into Batter Formaulation

When dry blending or using the hot/cold technique, a stock dry blend or stock gum solutioin need not be prepared. One could admix the hydroxypropyl methylcellulose and hot water, cool the mixture, allowing the solution to essentially hydrate. The gum solution is directly admixed with a batter mix to form a coating composition.

Dry Blending Using Dry Blend Stock:

1. Premix a 10 percent (w/w) of a cellulose ether with a dry batter mixtue, ensure thorough mixing to form a stock dry blend mix.
2. Incorporate an appropriate amount of 10 percent stock mix with a plain batter mix to achieve desired concentration level.
3. Slowly add dry ingredient into agitated cold water until the mixture is smooth and homogeneous.
4. Apply batter to food product (i.e., chicken), drain for 5 seconds and bread. Repeat batter/breading step if desired.
5. Fry food product as required, (i.e., chicken) nugget, 188° C. (370° F.) for 2 minutes.
6. Drain for 1 minute.

Hot/Cold Technique Using a Stock Solution:

Prepare a weight percent (w/w) cellulose ether gum solution by the hot/cold technique.

1. Premix 5 percent (w/w) cellulose ether with hot water to form a stock gum solution.
2. Allow the sample to fully hydrate at 4° C. for 72 to 96 hours.
3. Incorporate the appropriate amount of 5 percent stock solution into the water phase, which can be from about 5° to about 25° C., to achieve desired final wet batter concentration, i.e., 0.5 percent.
4. Slowly, add dry ingredient into agitated cold water component until the mixture is smooth and homogeneous; thereby forming a wet batter coating composition.
5. Apply the wet batter coating composition to the food product (i.e., chicken), drain for 5 seconds and bread. Repeat batter/breading step if desired.
6. Fry sample as required, (i.e., chicken nugget), 188° C. (370° F.) for 2 minutes.
7. Drain sample for 1 minute.

II. Formulation Concentrations When Using Stock Solution

In examples where cellulose ether stock solutions are added to make the composition, a 5 percent stock is prepared and enough of the stock solution is added to the water phase to give the desired concentration (e.g. 0.5 percent w/w) in the final wet batter coating composition.

A. Example to Make a 0.5 Percent Cellulose Ether Batter Using a 5 Percent Stock Gum Solution This is determined using the standard concentration/volume relationship as follows:

$$C_1 V_1 = C_2 V_2$$

Where
- $C_1$ = Concentration of stock solution = 5 percent
- $C_2$ = Desired final concentration of sample = 0.5 percent
- $V_1$ = Volume of stock needed to obtain final concentration = unknown.
- $V_2$ = Final volume of desired sample = 200 g in this example.

So:

$$C_1 V_1 = C_2 V_2$$

$$(5)(X) = (0.5)(200)$$

X = 20 g of 5 percent cellulose ether stock solution which = 1 g dry cellulose ether + 19 g water Formulations Using Either a Stock Gum Solution or Mixing Cellulose Directly with a Commercially Prepared Batter Mix.

| Ingredients | Percent Concentration (Percent) | Dry Blend Direct Mixing (grams) | Using a Stock Gum Solution (grams) |
|---|---|---|---|
| Commercial Batter | 29.5 | 59 | 59 |
| Water | 70.0 | 140 | 121 |
| Cellulose Ether | 0.5 | 1 Dry Powder | 20 g of 5 percent Stock Cellulose Ether Solution |
| Total | 100 percent | 200 g | 200 g |

B. Example to Make 0.5 Percent Cellulose Ether Batter Using a 10 Percent Dry Stock (in Batter Mix)

10 Percent Stock = 10 g Cellulose Ether + 90 g batter mix

To make a 0.5 percent batter:

$C_1 V_1 = C_2 V_2$
$C_1$ = 10 percent Stock
$C_2$ = Desired final concentration of 0.5 percent
$V_1$ = Unknown
$V_2$ = 200 g total Batch size
$C_1 V_1 = C_2 V_2$
$(10) V_1 = (0.5)(200)$ $V_1$ = 10 g of 10 percent Stock = 1 g Cellulose Ether + 9 g Batter Formulation using dry blending stock mix and a different commercially prepared batter mix.

| Ingredients | Dry Blending Stock Mixture (grams) |
|---|---|
| Commercial Batter | 47.14 |
| 10 percent Stock | 10.00 |
| Water | 142.86 |
| Total | 200.00 g |

III. The Control Sample

The Control Sample is prepared from a commercially prepared batter mix and is used to determine the percent fat reduction/absorption and percent increase in viscosity of the food product in the examples and comparative samples. The control sample is prepared as prescribed bleow:

| Ingredients | Percent Concentration (percent) |
|---|---|
| Commercial Batter | 45.5 |
| Cold Water | 54.5 |
| Total | 100 percent |

IV. Comparative Samples

For the comparative samples, the process for including a cellulose ether into a batter formulation by either dry blending or by the hot/cold technique is followed as previously described in Section I.

Comparative A formulation for dry blend and hot/cold technique

| Ingredients | Percent Concentration (percent) |
|---|---|
| Commercial Batter | 45.0 |
| Water | 54.5 |
| Methyl Cellulose Methoxyl - about 27.5 to about 31.5 weight percent | 0.5 |

Comparative B formulation for dry blend and hot/cold technique

| Ingredients | Percent Concentration (percent) |
|---|---|
| Commercial Batter | 45.0 |
| Water | 54.5 |
| Hydroxypropyl methylcellulose - about 19 to about 24 weight percent methoxyl; about 4 to about 12 weight percent hydroxypropyl - | 0.5 |

V. Examples of Invention

The process for including a cellulose ether into a batter formulation by either dry blending or by the hot/cold technique is followed as previously described in Section I.

EXAMPLES
formulation for dry blend and hot/cold technique

| Ingredients | Percent Concentration (percent) |
|---|---|
| Commercial Batter | 45.0 |
| Water | 54.5 |
| Hydroxypropyl methylcellulose | 0.5 |

EXAMPLE 1

The hydroxypropyl methylcellulose is from about about 27 to about 30 weight percent methoxyl substitution and from about 4 to about 7.5 weight percent hydroxypropyl substitution.

EXAMPLE 2

The hydroxypropyl methylcellulose is from about 28 to about 30 weight percent methoxyl substitution and from about 7.5 to about 12 weight percent hydroxypropyl substitution.

VI. Technique for Measuring Fat Absorption by a Soxhlet-Type Extraction

The cellulose ether mixture, which has been refrigerated at 4° C. for about 26 to about 96 hours, is used in formulating a batter coating composition. The food product is coated with the batter coating composition, fried and drained. The food product is placed in a freezer at −20° C. until the product is frozen. The frozen food products are placed in a waring blender with crushed dry ice and is pulverized into a powder. Fracturing the food product takes approximately 2 to 5 minutes. The dry ice is allowed to sublime to a gas, leaving a uniform chicken powder. Additionally, the cold condition allows for efficient recovery of the fat from the wall of the blender jar since the fat is in a solid state. Therefore, it is easily scrapped from the wall of the blender jar.

Approximately 3 grams of chicken powder are weighed and placed into a dry, tared soxtec micro-soxhlet extraction thimble, mixed with about 3 grams of sea sand and is plugged with about 1 grams of cotton. The thimbles are placed in a 150° C. oven for 1 hour to remove surface moisture.

The thimbles are placed in a soxtec micro-soxhlet extraction unit and the fat is extracted with petroleum ether for 35 minutes in the boil position, then 35 minutes in the rinse position of the equipment. The extracted fat is collected in a extraction cup. The petroleum ether is evaporated out of the collection cup and the extracted fat is heated at 105° C. for 1 hour. The fat is cooled ina desiccator for 10 to 15 minutes and weighed.

The amount of fat extracted is compared to the original 3 grams of chicken powder and the fat is expressed as a percent of the original fried chicken piece. The fat comparisons in Table I are expressed as a percent change from the control sample which contains NO CELLULOSE ETHERS. The data is reported as percent increase oir percent decrease relative to the control. Reference to Association of Official Analytical Chemists, AOAC Standard method is 24.005.

TABLE I-A
Percent Fat Reduction Comparisons Of Various Batter Preparation Techniques--Effectiveness Of Different Cellulose Ethers To Hydrate Under Various Conditions
(All samples at 0.5 percent (w/w) conc.)

| | Dry Blend (25° C.) Percent Fat REDUCTION | Hot/Cold Percent Fat Reduction |
|---|---|---|
| Example 1 | 14.52 | 55.45 |
| Example 2 | 30.90 | 48.18 |

As seen from Table I-A, when the prehydrated hydroxypropyl methylcellulose is used (hot/cold technique) the absorption of fat is significantly lower than the same hydroxypropyl methylcellulose dry blended.

TABLE I-B
Percent Fat Reduction/Absorbtion Comparisons Of Various Batter Preparation Techniques--Effectiveness Of Different Cellulose Ethers To Hydrate Under Various Conditions
(All samples at 0.5 percent (w/w) conc.)

| | Dry Blend (25° C.) Percent Fat ABSORPTION | Hot/Cold Percent Fat Reduction |
|---|---|---|
| Comparative A | 44.72 | 35.97 |
| Comparative B | 41.58 | 44.22 |

As indicated in Table I-B, when cellulose ethers, other than prescribed in the present invention, are employed, more fat is absorbed (dry blend) or the reduction in fat absorbed is less than when the specified hydroxypropyl methylcellulose is used (hot/cold).

Technique Used to Measure Viscosity

The viscosity of the examples of batter coating mixtures, varying the type of cellulose ether used, is meausred by using a Brookfield Digital Viscometer. Spindle #3 is used at 1.0, 2.5, 10.0 rpm depending on the examples viscosity measurement, and are determined at 23° C. The results are reported in centipoise (cps).

TABLE II
Viscosity Comparisons Of Various Batter Preparation Techniques--Effectiveness Of Having Different Cellulose Ethers In The Batter To Hydrate Under Various Conditions
(all samples at 0.5 percent (w/w) conc.)
Percent Increase in Viscosity as Compared to Control

| Sample | Dry Blend (25° C.) (Percent increase) | Hot/Cold (Percent Increase) |
|---|---|---|
| Example 1 | 87.99 | 96.35 |
| Example 2 | 87.93 | 96.49 |
| Comparative A | 55.05 | 94.51 |
| Comparative B | 86.72 | 96.04 |

The increase in viscosity for the hot/cold system compositions indicate that the cellulose ether is substantial hydrated.

What is claimed is:

1. A method of inhibiting oil absorption of a food product which comprises, coating the food product with a wet batter composition which contains an essentially prehydrated form of hydroxypropyl methylcellulose that has a methoxyl substitution of about 27 to about 30 percent and a hydroxypropyl substitution of about 4 to about 12 percent in an amount sufficient to inhibit oil adsorption by the food product upon frying.

2. The method of inhibiting oil absorption of a food product of Claim 1 wherein the coating composition contains from about 0.25 to about 1.5 weight percent hydroxypropyl methylcellulose.

3. The method of inhibiting oil absorption of a food product of claim 2 wherein the coating composition contains from about 0.5 to about 1 weight percent hydroxypropyl methylcellulose.

4. The method of inhibiting oil absorption of a food product of claim 3 wherein the coating composition contains about 0.5 weight percent hydroxypropyl methylcellulose.

5. The method of inhibiting oil absorption of a food product of claim 1 which further comprises: applying a breading to the coated food product before frying.

6. The method of inhibiting oil absorption of a food product of claim 1, wherein the hydroxypropyl methylcellulose has about 27 to about 30 percent methoxyl and about 4 to about 7.5 percent hydroxypropyl substitutuion.

7. The method of inhibiting oil absorption of a food product of claim 1, wherein the hydroxypropyl methylcellulose has about 28 to 30 percent mehoxyl and about 7.5 to about 12.0 percent hydroxypropyl substitution.

8. The method of inhibiting oil absorption of a food product of claim 1, wherein the hydroxypropyl methylcellulose coating compostion comprises: from about 0.25 to about 1.5 weight percent hydroxypropyl methylcellulose, from about 60 to about 80 weight percent water and from about 20 to about 40 weight percent percent batter mix.

9. The method of inhibiting oil absorption of a food product of claim 8, wherein the hydroxypropyl methylcellulose coating compositiion comprises: from about 0.25 to about 1 weight percent hydroxypropyl methylcellulose, from about 65 to about 75 percent water and from 25 to about 35 percent batter mix.

10. The method of inhibiting oil absorption of a food product of claim 1, wherein the coating composition has a viscosity from about 500 to about 1500 cps.

11. The method of inhibiting oil absorption of a food product of claim 10, wherein the coating composition has a viscosity from about 500 to about 1000 cps.

* * * * *